United States Patent [19]
Van Raden

[11] 3,803,997
[45] Apr. 16, 1974

[54] PARTICLE COLLECTING DEVICE

[75] Inventor: Earl M. Van Raden, Warren, Mich.

[73] Assignee: Mahon Industrial Corporation, Saginaw, Mich.

[22] Filed: Jan. 21, 1972

[21] Appl. No.: 219,630

[52] U.S. Cl................. 98/115 SB, 55/228, 55/238, 55/249, 261/114, 261/DIG. 44
[51] Int. Cl............................................. F23j 11/04
[58] Field of Search........................... 261/108–112, 261/116, 125, DIG. 54, DIG. 11, DIG. 44; 55/221, 223, 244, 246, 249, 239, 240, 241, 238, 258, 228; 98/115 SB

[56] References Cited
UNITED STATES PATENTS

| | | |
|---|---|---|
| 3,170,384 | 2/1965 | Kranz et al................. 98/115 SB X |
| 3,390,400 | 6/1968 | Dock.............................. 98/115 SB |
| 3,616,744 | 11/1971 | Jensen.............................. 98/115 K |
| 3,628,311 | 12/1971 | Costarella et al............. 98/115 K X |

Primary Examiner—Meyer Perlin
Assistant Examiner—Ronald C. Capossela
Attorney, Agent, or Firm—Hilmond O. Vogel

[57] ABSTRACT

A paint particle collection device positioned adjacent an article spray painting area wherein airborne paint overspray particles are entrapped in water which in overflowing a number of pans and being accelerated by high velocity air creates a series of waterfall filtering spray means to collect the air-borne paint particles. Paint particles caught in the water spray created by the waterfall and the high speed air movement through the spray booth are removed from the exhausted air stream and collect in a receiving tank.

11 Claims, 6 Drawing Figures

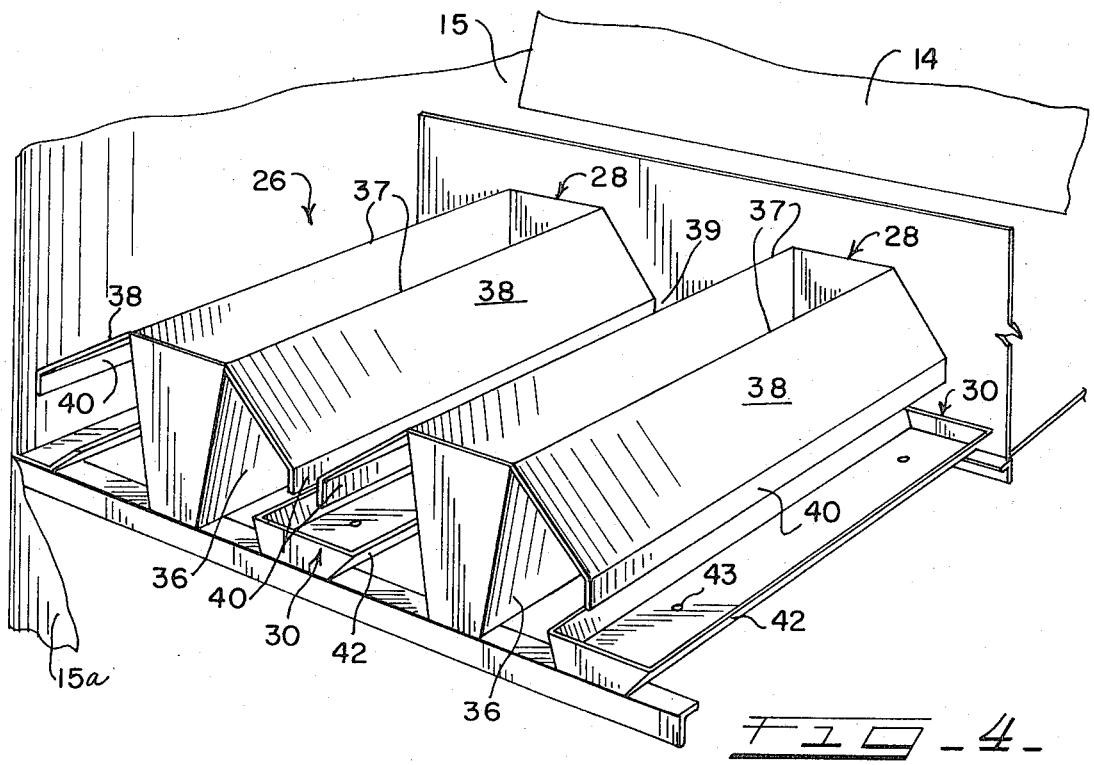
FIG_4_
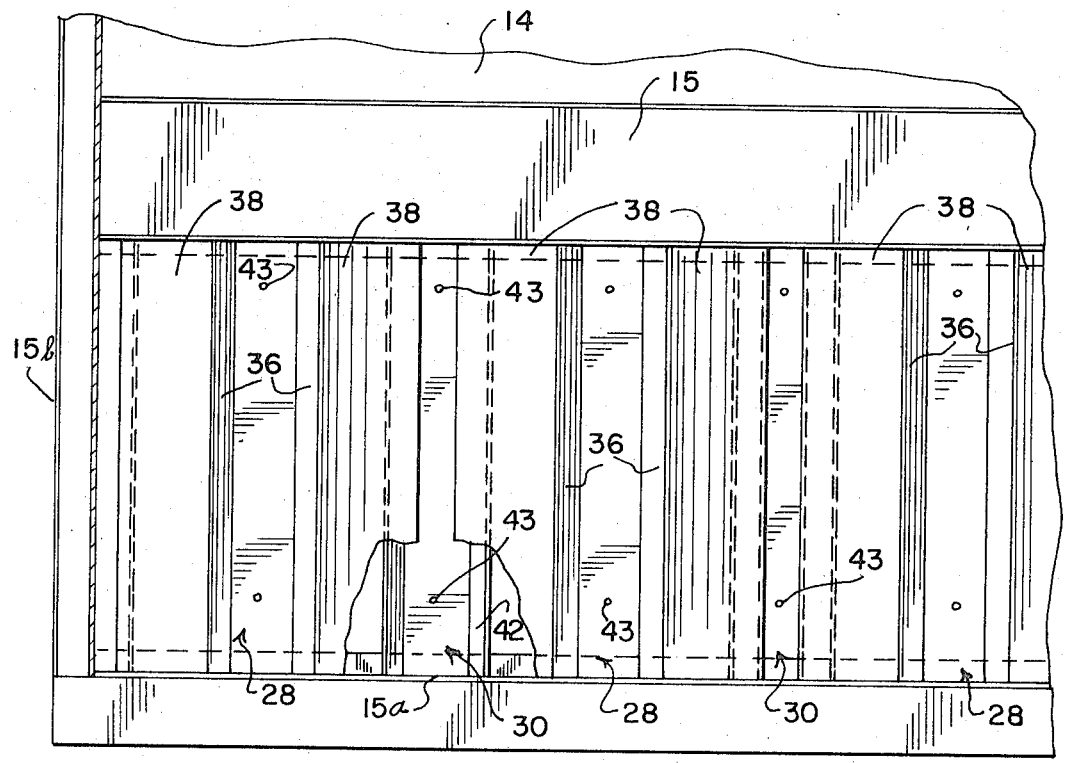
FIG_3_

3,803,997

PARTICLE COLLECTING DEVICE

BACKGROUND OF THE INVENTION

1. Field of the Invention:

This invention relates to a paint spray eliminator wherein paint particles are removed from the air by a collecting device having a series of waterfall filtering points.

2. Description of the Prior Art:

Prior art type of paint spray booths includes a back section wherein air-borne water and paint particles are removed from the air and also have water screen and tank units and a section wherein air is sprayed with water to remove the fine paint particles. After the spraying operation the spray water must then be removed from the air which has been done by units called eliminators which are usually closely spaced sheet metal parts which deflect and reverse the direction of the air flow to slow down the air at a series of points to permit the heavier water particles to drop out of the air stream. The back section generally requires rather complex and difficult to manufacture components to perform the air reversal and slow down to cause the heavier water particles to drop from the air stream. As with the conventional types of spray booths and their associated back sections there is a requirement for these eliminators to function as a final step in removing the water and attached paint particles from the air before the air is exhausted to the outside. This requirement that the air be completely free of moisture and any air-borne paint particles is accentuated even more today with the widespread concern for preventing air pollution and also preventing discoloration of the surrounding area should visible paint particles not be filtered from the air stream. Applicant's invention has eliminated this spray booth back section and also eliminated the associated problem of manufacturing and installing as well as designing the eliminators for effective removal of paint from the exhaust air stream.

The present invention may be installed as a new or conversion unit and is not limited to a side draft application but may also be used on down draft or other type units.

SUMMARY

The present invention relates to a spray painting operation wherein paint overspray is drawn through the filtration network of the spray booth and paint particles are effectively removed from the air stream prior to its being exhausted into the atmosphere. In operation the paint filtration process involves a series of pan portions which include depending flange portions. The pans are overflowed with water and the flanges direct water through a throat area which increases the velocity of the blower induced air stream and thereby produces a turbulent air causing the overflowing of water to develop into a fine spray and consequently develop an effective filtering operation for removal of paint particles in the air which is passing through this highly turbulent section of the spray booth. Additional pans are positioned below the throat area to form a second waterfall point for additional collection of paint particles.

It is therefore an object of the present invention to provide an air filtration apparatus for removal of paint particles from the air by pulling the air through a spray booth section containing a series of overflow pans having associated turbulent areas which develop a fine water spray for removal of paint particles from the air.

It is another object of the present invention to provide an air filtering apparatus wherein high velocity air produces turbulent areas and combines with a waterfall type of water movement to develop a spray which adheres to and filters paint particles from the moving air.

Further it is an object of the present invention to provide a filtering apparatus which may be easily adapted to conventional spray booths and eliminates the need for a spray booth back section to remove air-borne water particles prior to exhausting an air stream to the atmosphere.

These and other objects of the invention will become apparent from reference to the following description, appended claims and attached drawings.

BRIEF DESCRIPTION OF THE DRAWINGS

FIG. 3 is a top plan view taken along line 3—3 of FIG. 2;

FIG. 4 is a pictorial view with portions removed of a section of the filtering device;

DETAILED DESCRIPTION

Figure 1:
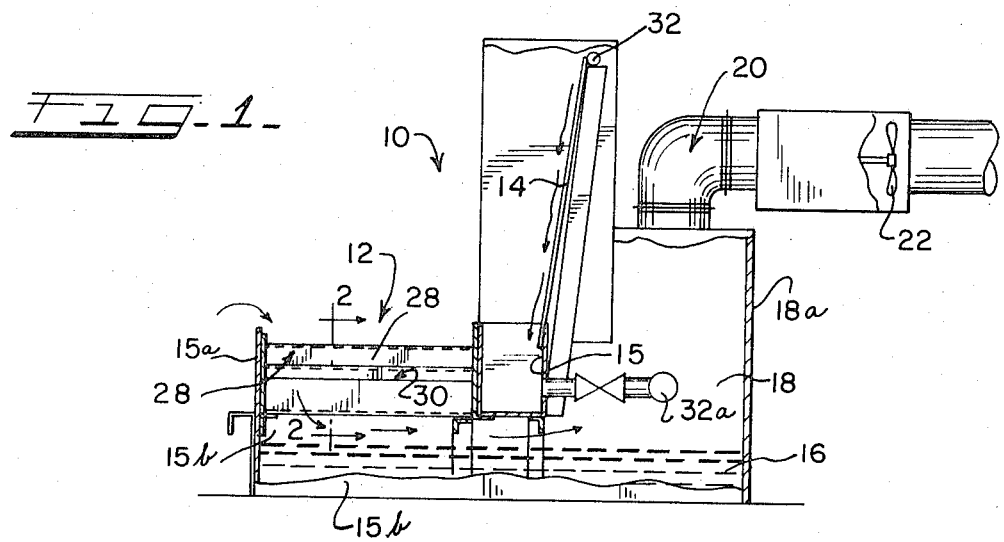
FIG. 1 is a side view partially in section of the paint spray filtering apparatus of the present invention.

Referring now to the drawings and in particular to FIG. 1, there is illustrated a paint overspray collection booth 10 including an air intake portion 12 and a water screen 14 sloping upwardly and outwardly of the air intake portion as is generally the construction of conventional side draft booths. A trough 15, which is a channel shaped water receiving portion, is positioned at the foot of the water screen 14 and accumulates water which has run down the water screen 14. The air intake portion 12 is defined by a booth front panel member 15a and a pair of side portions 15b. The lower portion of the overspray collection booth 10 includes a water tank 16 which accumulates a certain height of water for storage during filtering. Spaced to the right of the trough 15 illustrated in FIG. 1 is a spray booth plenum chamber 18 wherein the air which is drawn through the overspray booth is finally exhausted. Air being exhausted is directed between the back portion of the water screen 14 and the back wall 18a. Positioned atop the overspray booth are a series of duct members generally designated by the numeral 20 which are associated with a blower or fan member 22 which provides a pressure differential to thereby move the air through the spray booth and through the overspray collecting booth.

Figure 2:
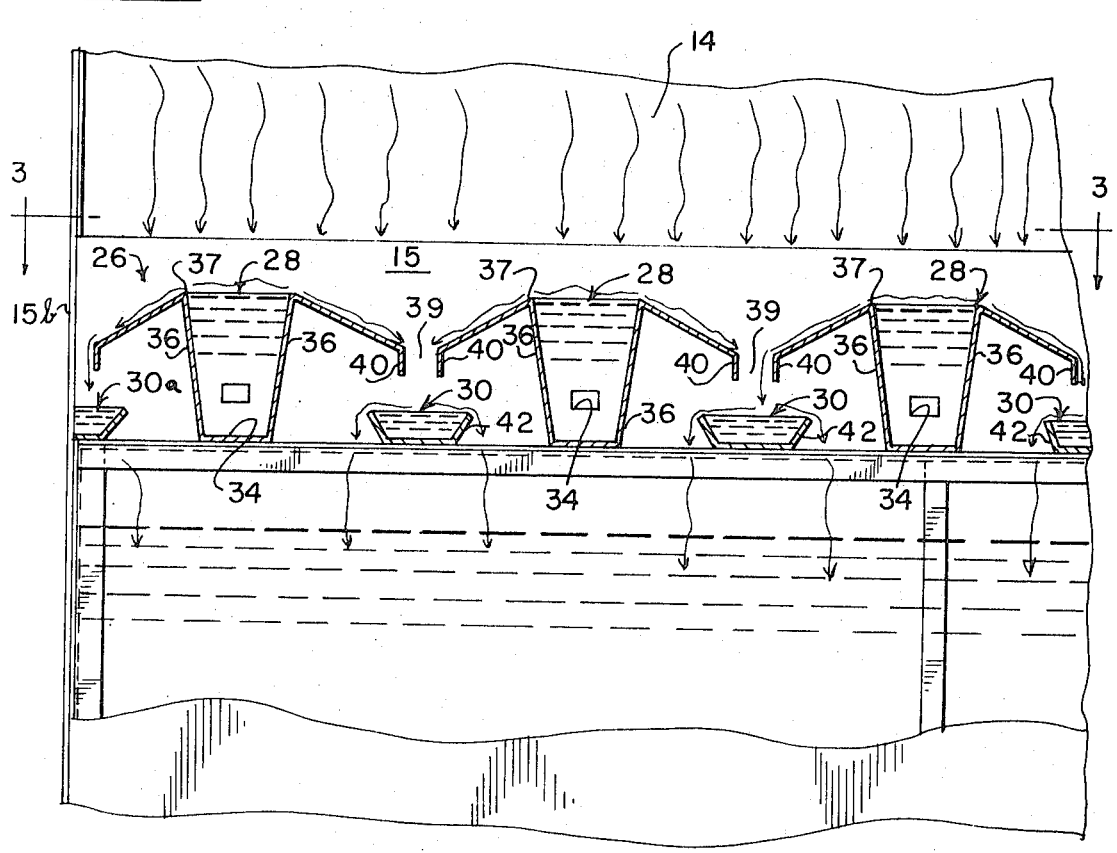
FIG. 2 is a partial sectional view taken along line 2—2 of FIG. 1.

Now referring to FIGS. 2 and 4 for a description of the filtration pan members it is noticed that the plurality of overflow pans 26 positioned across the air intake portion 12 include the fill-up pans 28 spaced across the air intake opening and a smaller dish member 30 positioned between the large fill-up pans 28. Half size dish members 30a are mounted adjacent the sides 15b and function similarly to the full size members 30. When the water supply is turned on the water header 32 shown atop the water screen 14 in FIG. 1 will provide a steady flow of water down the water screen 14 to assist in filling the trough 15. A second water supply header 32a also supplies water directly into the trough 15. In down draft spray booths only the water supply header 32a would fill the trough 15 (see FIG. 5). As the trough fills, water will flow through the conduit or passageway 34 of the trough 15 which directs water between the sloped sides 36 of the fill-up pans 28. It is noticed that as the pans 28 overflow, water will be directed over the weir portions 37 and down the downwardly and outwardly extending flanged portions 38 and through the throat or opening 39 which is defined as the area between the lip portions 40 where the air is accelerated. As water and air move through the throat 39 toward the overflow pans 30 the overflow pans will begin to be filled with water and will overflow over their sides 42 producing a second waterfall area. Water overflowing the pans 28 and 30 in the form of heavy water particles will fall into the water tank 16 and lighter particles will be moving with the air stream toward the air exhaust of plenum 18. Since the velocity of the air stream is reduced between the throat 39 and the air duct 20, the lighter paint particles will also fall into the tank 16 as air velocity is reduced.

By referring to FIG. 1 it is noticed that the throat area below the trough 15 and the top of the surface of the water in the water tank portion 16 is large enough to permit the air to decelerate. This change in cross sectional areas from small to relatively large decreases the velocity of the air and such a slow-down permits the water particles to drop from the moving air stream which will not support water particles below a velocity of approximately 500 feet per minute. Thus in this plenum chamber 18 the air velocity is kept below 500 feet per minute to allow the water particles to drop out of the air stream and provide an air stream which has a low water content and virtually no paint particles contained therein.

Pan members 28 and 30 may also include drain openings 43 for emptying of the pans when the spray booth unit is not in operation.

Figure 5:
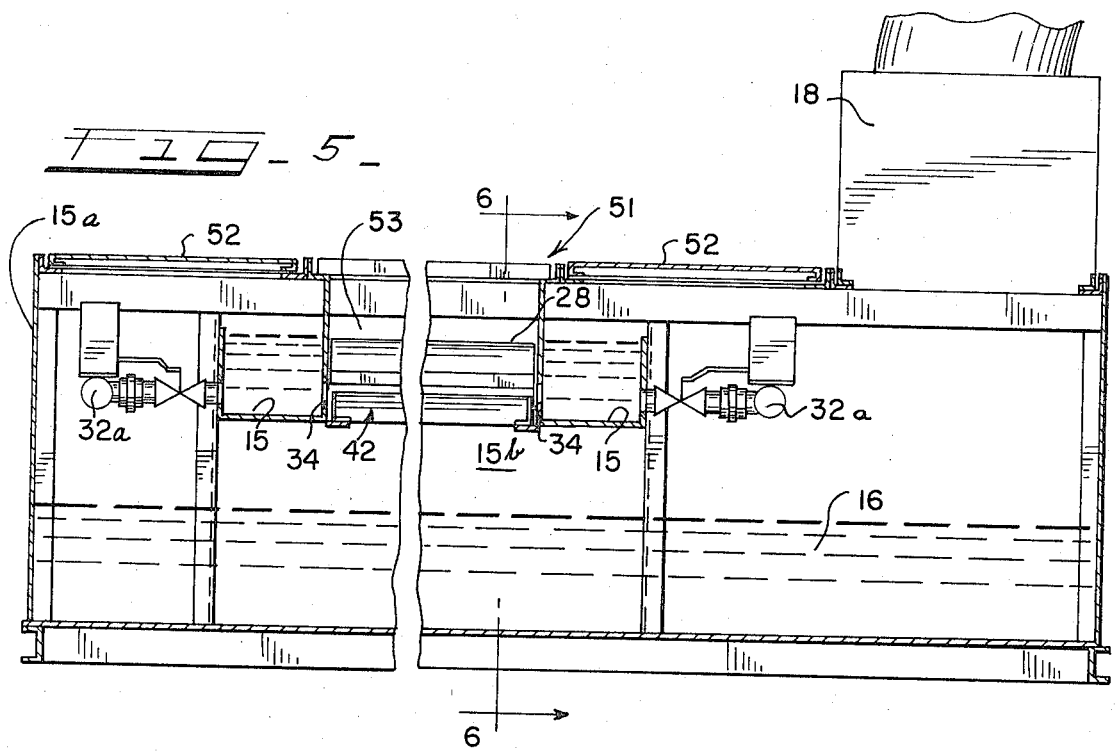
FIG. 5 is a sectional side elevation view of the present invention installed in a down draft spray booth.
Figure 6:
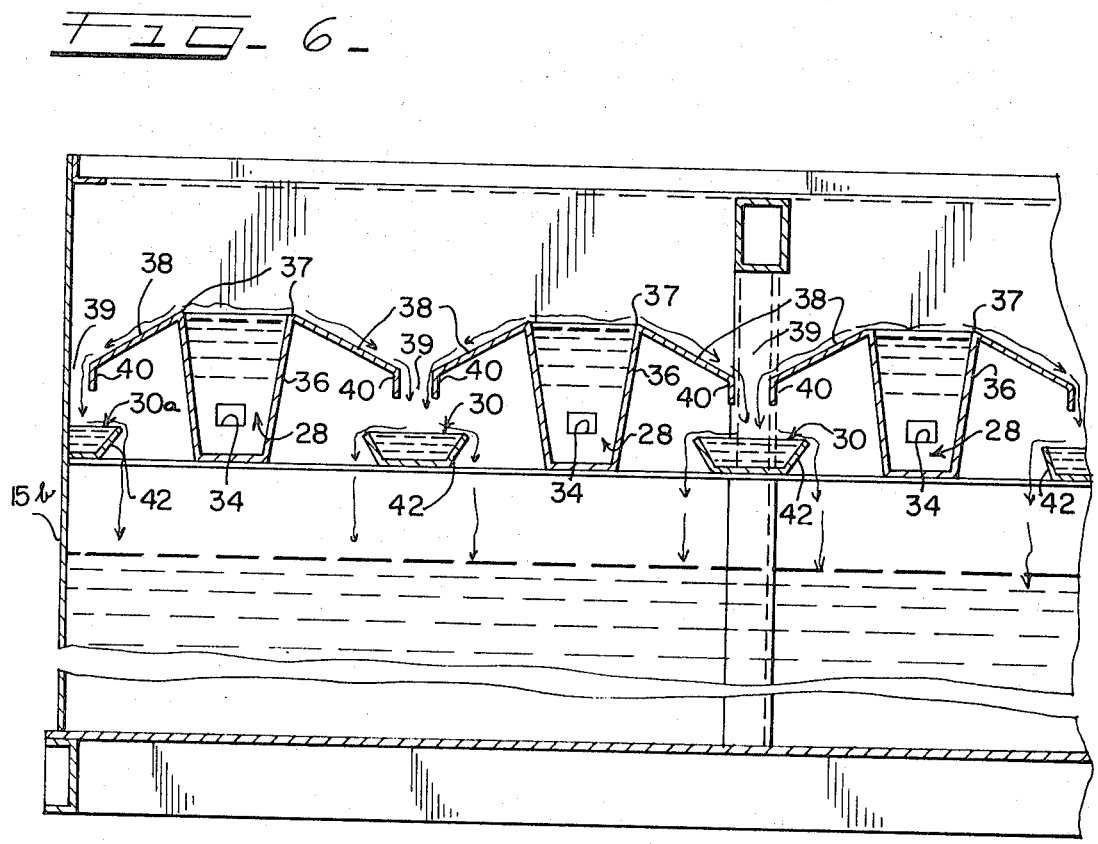
FIG. 6 is a removed section view taken along line 6—6 of FIG. 5.

The overspray booth 51 illustrated in FIGS. 5 and 6 is commonly called a down draft booth wherein air moving through the spray area is directed from top to bottom of the article being sprayed to thereby produce a vertical downward direction of the paint overspray. In FIG. 5 these overspray platforms 52 are illustrated and disclose a general configuration wherein the articles being sprayed move over a central portion of the spray booth carried generally on an overhead or floor mounted conveyor and spray personnel will stand on the solid platforms 52 while spraying of the moving articles from each side is being accomplished. Air moves through the passageway 53 and across the filtering pan arrangement of the present invention which is disposed directly below the passageway 53 and functions in the same manner as the filtering involved in a side spray booth which has been disclosed earlier in this description. In this down draft booth a pair of troughs 15 are disclosed positioned at either end of the overflow pans and filled by a pair of headers 32a since a water screen is not involved in this design. Similar parts used in both the down draft and side draft booths are designated by the same reference numerals.

THE OPERATION

In operation the spray booth paint eliminator functions by entrapping paint particles in a stream of air and subsequently passing this stream of air across and through a series of waterfall points which have a highly turbulent area and consequently an associated water mist contained in this turbulence which will adhere to paint particles. Heavy paint particles and heavy paint and water globules fall into the water tank which is then recirculated through a filtering device which removes paint.

As water is emitted from the water header 32 illustrated in FIG. 1, it flows down the water screen 14 and produces an initial particle collecting point since air being drawn through the air intake portion 12 will impinge to a certain degree on this water screen 14 and thus provide an initial collecting point for paint removal. Water falling down the water screen 14 along with the water from header 32a fills the trough 15 and, as described earlier, will flow through the delivery conduits 34 into the fill-up pan 28. Water overflowing the pans 28 moves over weir 37 and down the sloped portions 38 through the throat area 39 which is defined as the area between the depending flange portions 40 of the sloped portions 38. As air moves through this narrow throat it is increasing in velocity and consequently will produce a high speed water particle movement as it picks up water falling from the lips 40. This rapidly moving water will fill up the dish members 30 and as the dishes 30 fill and overflow a second waterfall effect is produced for further collecting of paint overspray particles. It is pointed out at this point that the high velocity air moving through the throat 39 at a velocity generally between 3,000 and 6,000 feet per minute impinges the water in the dishes 30 and because of the sloped sides 42 will provide a very effective water sling by producing a concave water level in the dish 30 and a high velocity water spray is emitted over the top edges of the side walls 42. Thus at this point it is noticed that water overflowing and falling through the throat 39 is accelerated by the high velocity air stream and produces a mist of spray particles which engulf the air as it moves through and adhere to air-borne paint particles to collect a great portion of any paint particles which are contained in the air. Also the spray produced by water overflowing the sides 42 of the dishes 30 produces a second water spray which provides additional collecting points for removal of paint particles from the air.

As the air stream moves from the air intake portion 12 through the portion which contains the pans 28 and 30 and across the top of the water in the water tank 16, the air passes under the bottom of the trough 15 and the top of the water level in the tank 16 where it is given a continuously lower velocity for the time it passes under the trough and then as it reaches the spray booth plenum 18 the area in which the air is traveling is greatly increased and therefore produces a slower velocity of air in the plenum. The air in the plenum chamber 18 is to travel at a velocity of less than about 500 feet per minute which is the speed of air below which water particles will fall out of the air stream.

It should also be pointed out that the configuration presented in this disclosure is not limited to an application in so-called side draft booths wherein the articles being spray painted are between the painter and the water screen. The present invention lends itself to an installation such as a down draft booth which is shown in FIGS. 5 and 6 wherein the articles being painted would be above the pans disclosed in the present invention and can be painted from either side and no water screen is present.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A collecting device positioned adjacent an article spray painting area for entrapping overspray paint particles comprising:
 a tank having water at a certain line therein,
 a water screen extending in an upright manner above said water level,
 a source of water for directing water downwardly on said screen,
 a horizontal trough below said screen collecting said downwardly directed water,
 said tank having air intake means spaced laterally to one side of said trough,
 a plurality of side-by-side water collecting containers having communicating means with said trough,
 laterally extending members connected to upper portion of said containers,
 portions of adjacent laterally extending members forming a throat between adjacent collecting containers, said throat being disposed below the upper portions of said containers whereby water overflowing from said containers and air is directed downwardly through said throat in a turbulent manner,
 a second water collecting container disposed below said throat and above the water level in said tank to receive the overflow water from said first collecting containers,
 overflow of water from said second container being directed into said water in said tank,
 a plenum chamber communicating with said tank, and
 an exhaust blower communicating with said plenum chamber for discharging air from said plenum chamber.

2. The invention in accordance with claim 1, said trough being substantially centrally located within said tank and above said water level, said air intake means being located at one side of said trough, and said plenum chamber being disposed on the other side of said trough.

3. The invention in accordance with claim 1, including a second source of water communicating directly with said trough.

4. The invention in accordance with claim 3, said water level in said tank being maintained at a predetermined level below said second water collecting container to provide a horizontally extending air passage communicating with said air intake means and said plenum chamber.

5. The invention in accordance with claim 4, including drain openings within said collecting containers communicating directly with said tank.

6. The invention in accordance with claim 1, said laterally extending members having downwardly extending flanges defining said throat.

7. The invention in accordance with claim 6, said laterally extending members sloping downwardly and said second water collecting container having side walls diverging outwardly and upwardly.

8. A collecting device adapted to be positioned in an article spray painting area for entrapping overspray paint particles comprising:
 a tank having a certain level of water therein,
 a plenum chamber communicating with said tank,
 an exhaust blower communicating with said plenum chamber for exhausting air from said tank,
 a trough positioned above said water level,
 means for directing water to said trough,
 first side-by-side water collecting containers laterally spaced relative to said trough and communicating therewith,
 said first water collecting containers having side walls with upper edge portions over which overflow water is discharged,
 laterally extending members connected to said upper edge portions whereby adjacent portions of said members of two first containers form a throat disposed above the water level in said tank and below the upper edge portion of said first containers,
 said throat providing for the intake and mixture of air and paint particles as the mixture flows through said throat in a turbulent manner,
 a second water collecting container disposed below said throat to receive said intermixed water and paint,
 said second container having upper edge means discharging overflow of water and paint to said water in said tank, and
 said trough and containers being vertically spaced from said water level in said tank to provide an enlarged passage therebetween for discharging air laterally to said plenum chamber.

9. The invention in accordance with claim 8, said upper edge means including laterally extending flange members.

10. The invention in accordance with claim 9, said flange members sloping downwardly.

11. The invention in accordance with claim 10, said flange members having connected thereto downwardly extending flange portions forming said throat.

* * * * *